United States Patent
DeSario et al.

(10) Patent No.: US 12,318,761 B2
(45) Date of Patent: Jun. 3, 2025

(54) STABILIZATION OF REACTIVE OXYGEN SPECIES IN CERIA-BASED COMPOSITE AEROGELS

(71) Applicant: The Government of the United States of America, as represented by the Secretary of the Navy, Arlington, VA (US)

(72) Inventors: Paul A. DeSario, Alexandria, VA (US); Debra R. Rolison, Arlington, VA (US); Jeffrey W. Long, Alexandria, VA (US); Robert B. Balow, Mount Rainier, MD (US); Travis G. Novak, Lorton, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 57 days.

(21) Appl. No.: 17/328,195

(22) Filed: May 24, 2021

(65) Prior Publication Data
US 2021/0362131 A1  Nov. 25, 2021

Related U.S. Application Data

(60) Provisional application No. 63/028,644, filed on May 22, 2020.

(51) Int. Cl.
| | |
|---|---|
| *B01J 23/10* | (2006.01) |
| *A62D 3/17* | (2007.01) |
| *A62D 3/38* | (2007.01) |
| *B01J 21/06* | (2006.01) |
| *B01J 23/52* | (2006.01) |
| *B01J 23/72* | (2006.01) |
| *B01J 35/23* | (2024.01) |
| *B01J 35/30* | (2024.01) |
| *B01J 35/39* | (2024.01) |
| *B01J 37/02* | (2006.01) |
| *B01J 37/03* | (2006.01) |
| *B01J 37/04* | (2006.01) |
| *A62D 101/02* | (2007.01) |
| *A62D 101/26* | (2007.01) |

(52) U.S. Cl.
CPC .............. *B01J 23/72* (2013.01); *A62D 3/17* (2013.01); *A62D 3/38* (2013.01); *B01J 21/063* (2013.01); *B01J 23/10* (2013.01); *B01J 23/52* (2013.01); *B01J 35/23* (2024.01); *B01J 35/39* (2024.01); *B01J 35/394* (2024.01); *B01J 37/0236* (2013.01); *B01J 37/036* (2013.01); *B01J 37/04* (2013.01); *A62D 2101/02* (2013.01); *A62D 2101/26* (2013.01)

(58) Field of Classification Search
None
See application file for complete search history.

(56) References Cited

U.S. PATENT DOCUMENTS

| | | | |
|---|---|---|---|
| 6,057,488 A | 5/2000 | Koper et al. | |
| 6,492,014 B1 | 12/2002 | Rolison et al. | |
| 7,081,433 B2 | 7/2006 | Rolison et al. | |
| 9,308,517 B1 | 4/2016 | Peterson et al. | |
| 2007/0249494 A1* | 10/2007 | Eyring | B01J 37/0211 502/237 |
| 2016/0201183 A1* | 7/2016 | Zinn | B32B 15/01 428/557 |
| 2016/0228855 A1 | 8/2016 | Bae et al. | |
| 2019/0211264 A1 | 7/2019 | Worsley et al. | |

FOREIGN PATENT DOCUMENTS

| | | | |
|---|---|---|---|
| CN | 106450352 | * | 12/2016 |
| CN | 106540352 A | | 2/2017 |

OTHER PUBLICATIONS

Laberty-Robert, Christel et al. "Ionic Nanowires at 600 degrees C . . . ". Advanced Materials. 19, 1734-1739 (2007 ) (Year: 2007).*
Wenming, Chen et al. "Influence of morphology . . . ". Science Direct. Journal of Rare Earth. vol. 35. No. 10. 970. 2017 (Year: 2017).*
Li, Gao-Ren, et al. "Hierarchically Porous Gd 3+ . . . ". J. Phys. Chem. 113, 1235-1241. (2009). (Year: 2009).*
Daintith, John. (2008). Dictionary of Chemistry (6th Edition)—cerussite. (pp. 111). Oxford University Press. Retrieved from https://app.knovel.com/hotlink/pdf/id:kt008IG571/dictionary-chemistry/cerussite (Year: 2008).*
Dictionary.com. "ceria". https://www.dictionary.com/browse/ceria#:~:text=noun,%2C%20glass%20polishing%2C%20and%20decolorizing. (Year: 2023).*
Dictionary.com. "cerium oxide" https://www.dictionary.com/browse/ceria#:~:text=noun,%2C%20glass%20polishing%2C%20and%20decolorizing. (Year: 2023).*
Du et al. "From Ceria Clusters to Nanoparticles: Superoxides and Supercharging" J . Phys. Chem. C 2019, 123, 1742-1750.

(Continued)

*Primary Examiner* — Sheng H Davis

(74) *Attorney, Agent, or Firm* — US Naval Research Laboratory; Joseph T. Grunkemeyer

(57) ABSTRACT

A composition having a gadolinium-, samarium-, or lanthanum-substituted porous cerium oxide and copper or gold nanoparticles. The composition can be exposed to electromagnetic radiation to form reactive oxygen species in the composition to decompose organophosphonate compounds. The composition may be made by forming a mixture of a cerium salt; a gadolinium, samarium, or lanthanum salt; and an epoxide; forming gel from the mixture; and drying the gel to form an aerogel, a xerogel, or an ambigel. Copper or gold nanoparticles are added or formed at any point in the method.

8 Claims, 11 Drawing Sheets

(56) References Cited

OTHER PUBLICATIONS

Laberty-Robert et al. "Ionic Nanowires at 600° C.: Using Nanoarchitecture to Optimize Electrical Transport in Nanocrystalline Gadolinium-Doped Ceria" Adv. Mater. 2007, 19, 1734-1739.

McEntee et al. "Mesoporous Copper Nanoparticle/TiO2 Aerogels for Room-Temperature Hydrolytic Decomposition of the Chemical Warfare Simulant Dimethyl Methylphosphonate" ACS Appl. Nano Mater. 2020, 3, 3503-3512.

Pitman et al. "Stabilization of reduced copper on ceria aerogels for CO oxidation" Nanoscale Adv., 2020, 2, 4547.

Rolison et al. "Power of Aerogel Platforms to Explore Mesoscale Transport in Catalysis" ACS Appl. Mater. Interfaces 2020, 12, 41277-41287.

Schilling et al. "Experimental and Theoretical Study on the Nature of Adsorbe Oxygen Species on Shaped Ceria Nanoparticles" J. Phys. Chem. Lett. 2018, 9, 6593-6598.

Chen et al., "Dimethyl methylphosphonate decomposition on fully oxidized and partially reduced ceria thin films" Surface Science 604 (2010) 574-587.

Search Report and Written Opinion in PCT/US2021/033863 (Sep. 14, 2021).

* cited by examiner

1

STABILIZATION OF REACTIVE OXYGEN SPECIES IN CERIA-BASED COMPOSITE AEROGELS

This application claims the benefit of U.S. Provisional Application No. 63/028,644, filed on May 22, 2020. The provisional application and all other publications and patent documents referred to throughout this nonprovisional application are incorporated herein by reference.

TECHNICAL FIELD

The present disclosure is generally related to materials for decomposition of chemical threats.

DESCRIPTION OF RELATED ART

The ability to mitigate chemical warfare agents (CWAs) and toxic industrial compounds (TICs) under a wide range of environmental and exposure conditions is a critical challenge. Threats from toxic chemicals, such as chemical warfare agents (CWAs) or toxic industrial chemicals (TICs) can occur at any time, thus, materials deployed to mitigate chemical threats must function without fail around the clock. While the most operationally relevant and abundant stimulus for driving decontamination chemistry is sunlight, sunlight-driven processes face intermittency challenges that do not satisfy the need for 24/7 protection. Protective materials that possess both dark and photo-initiated degradation pathways can fulfill the need for continual threat mitigation. Effective materials for around-the-clock protection against chemical threats should contain: 1) a high surface area, molecularly accessible, and stable support that possesses inherent CWA-adsorption and -degradation activity in the dark; 2) a photo-sensitizing component that provides additional reactive charges to enhance degradation under solar illumination; and 3) a solid-state storage component that stabilizes reactive chemical species at a heterogeneous interface-even in the presence of ambient $O_2$ and $H_2O$—thereby driving post-illumination degradation.

Storage of photocatalytic potential, colloquially referred to as "memory catalysis," "day-night photocatalysis," or "'round-the-clock photocatalysis" has attracted a surge of research attention recently. Nearly every memory catalyst described to date relies on a storage mechanism (Cai et al., *J. Photochem. Photobio. C,* 39 (2019) 58-75) that is impractical for operando chemical warfare (CW) protection environments. Ceria-based aerogels offer an opportunity to leverage what hinders most memory catalysts: the rapid scavenging of electrons with $O_2$ that quenches reactivity. Most photocatalysts do not directly oxidize or reduce target compounds, but derive their activity through highly reactive chemical intermediaries, such as hydroxyl radicals ($OH^+$) or other activated oxygen species. Ceria-based aerogels offer an opportunity to stabilize such highly reactive oxygenates in the absence of direct photo-illumination.

BRIEF SUMMARY

Disclosed herein is a composition comprising: a gadolinium-, samarium-, or lanthanum-substituted porous cerium oxide and copper or gold nanoparticles.

Also disclosed herein is a method comprising: providing a composition comprising gadolinium-, samarium-, or lanthanum-substituted porous cerium oxide and optional copper or gold nanoparticles; and exposing the composition to electromagnetic radiation to form reactive oxygen species in the composition.

Also disclosed herein is a method comprising: forming a mixture comprising: a cerium salt; a gadolinium, samarium, or lanthanum salt; and an epoxide; forming a gadolinium-, samarium-, or lanthanum-substituted cerium oxide gel from the mixture; and drying the gel to form an aerogel, a xerogel, or an ambigel. Copper or gold nanoparticles are added or formed at any point in the method.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a composite material that uses sunlight to generate and subsequently store reactive oxygen species (ROS) that are stable in real-world environments, yet sufficiently active to mitigate chemical threats for extended times even after cessation of the light stimulus. Chemical threats may include organophosphorus chemical warfare agents (CWAs) or organophosphorus pesticides as well as other classes of CWAs and volatile organic compounds. Many materials that degrade chemical threats require an external stimulus for activation, such as photocatalytic materials that are only active under constant illumination with high-energy irradiation, but offer minimal protection in the absence of this stimulus. Defect sites in nanoscale ceria ($CeO_2$) can react with ambient oxygenates and photogenerate oxidants that are stable under ambient conditions. Ceria aerogels are synthesized by a sol-gel process that can be modified by doping or addition of metal nanoparticles to promote the formation of surface-defects that stabilize ROS. The ability of $CeO_2$ aerogels with tailored defects to store ROS, which have sufficient oxidizing potential to degrade a variety of compounds, including those used as CWAs, will enable these species to react with toxic compounds even if no external stimulus is applied. Coupling visible light-active plasmonic sensitizers or semiconducting photocatalysts with the ROS-storing capability of $CeO_2$ is a viable strategy to incorporate multiple degradation pathways-dark and photo-driven-into a composite material.

Because $O_2$ is a rapid electron scavenger and most CW protective environments are oxic, the materials incorporate a storage mechanism that stores activated oxygen. The $O_2$-quenched electrons ($e^-$) generate ROS including superoxides ($O_2^{\cdot-}$) and peroxides ($O_2^{\cdot 2-}$) that are stabilized at defects in nanoscale $CeO_2$ and thereby stored in the dark.

Figure 2:
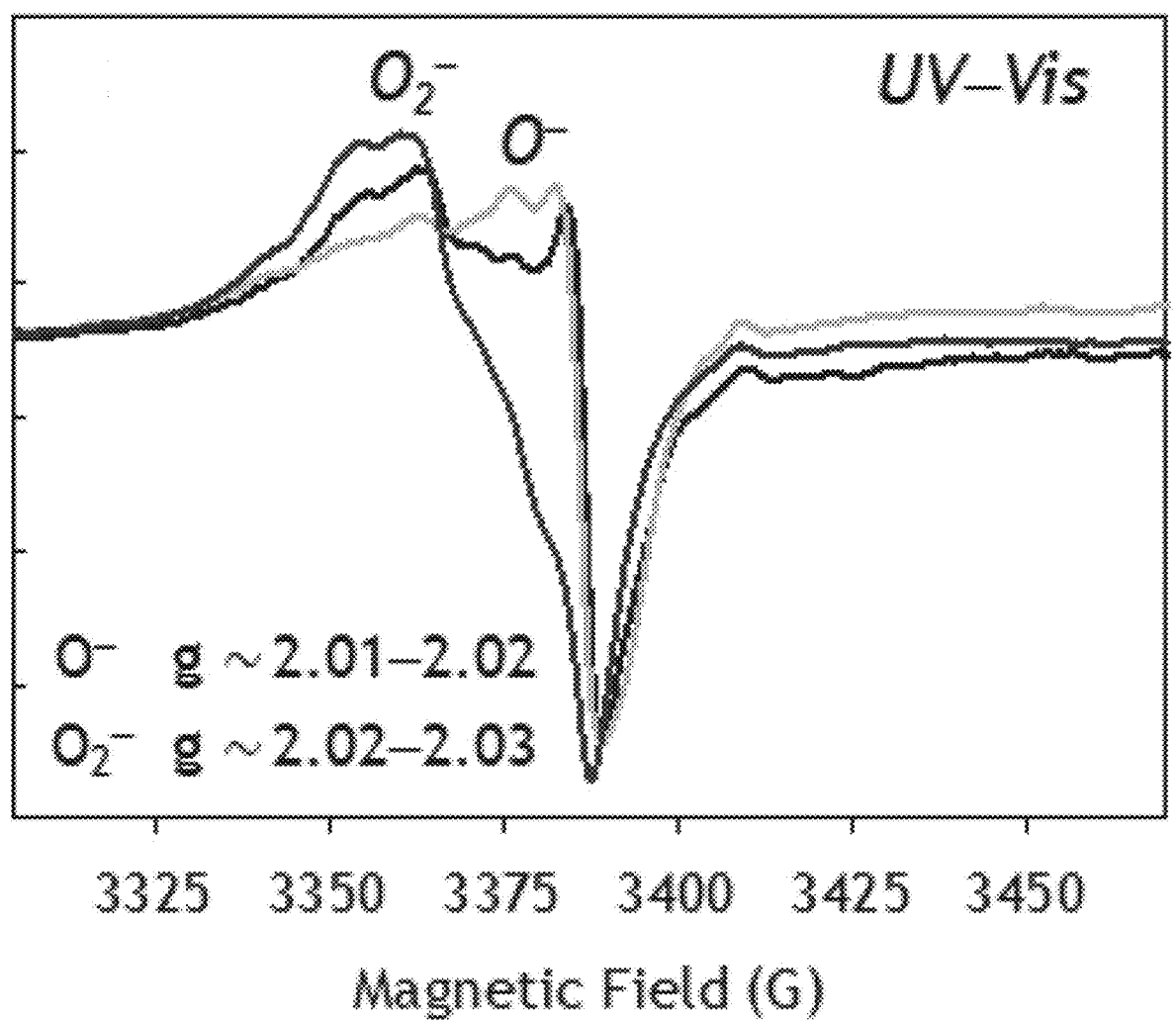
FIG. 2 shows electron paramagnetic resonance showing formation of peroxide and superoxide under UV-Vis irradiation at $TiO_2$ and $Au/TiO_2$ aerogels.
Figure 3:
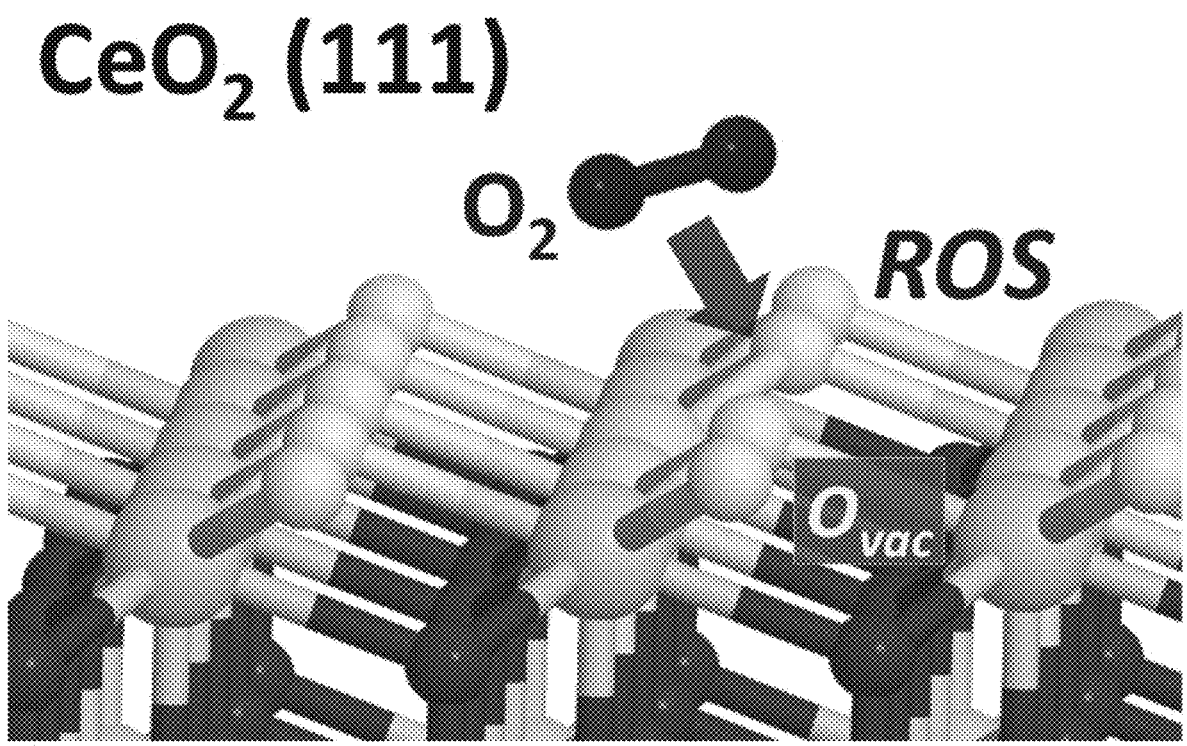
FIG. 3 shows a schematic of reactive oxygen species stabilized on solid-state oxygen vacancies ($O_{vac}$) in $CeO_2$.

Ceria-based materials have been demonstrated to degrade CW simulants (Chen et al., *Surf Sci.* 604 (2010) 574-587), but have not yet been characterized for photocatalytic CW threat mitigation or a memory catalysis effect. A composite design is used herein to incorporate photo-initiated degradation pathways and memory-catalysis functionality into a $CeO_2$-based platform. The $CeO_2$ may be synthesized in an aerogel form and doped to synthetically incorporate defect sites that enable $CeO_2$ to act as a porous solid-state storage material for ROS. Not only do the $CeO_2$ aerogels possess tailorable defect sites, but they also provide through-continuous porosity into the interior of the nanoarchitecture that allows the high-area surface to be readily available to vapor-phase molecules. The CWA-adsorbing and ROS-storing $CeO_2$ aerogels are coupled to photocatalytic materials to enhance photo-initiated degradation pathways and increase generation of ROS under illumination. Nanostructured $CeO_2$ is coupled either directly with nonprecious plasmonic nanoparticles (ex. copper, Cu) or incorporated within a semiconducting oxide composite aerogel (ex. $TiO_2$) to form a tri-phase composite that incorporates (FIGS. 1-3): i) a plasmonic sensitizer; ii) a ROS-producing and CWA-adsorbing oxide support with high surface area and porosity; and iii) a solid-state sink for ROS.

Figure 4:
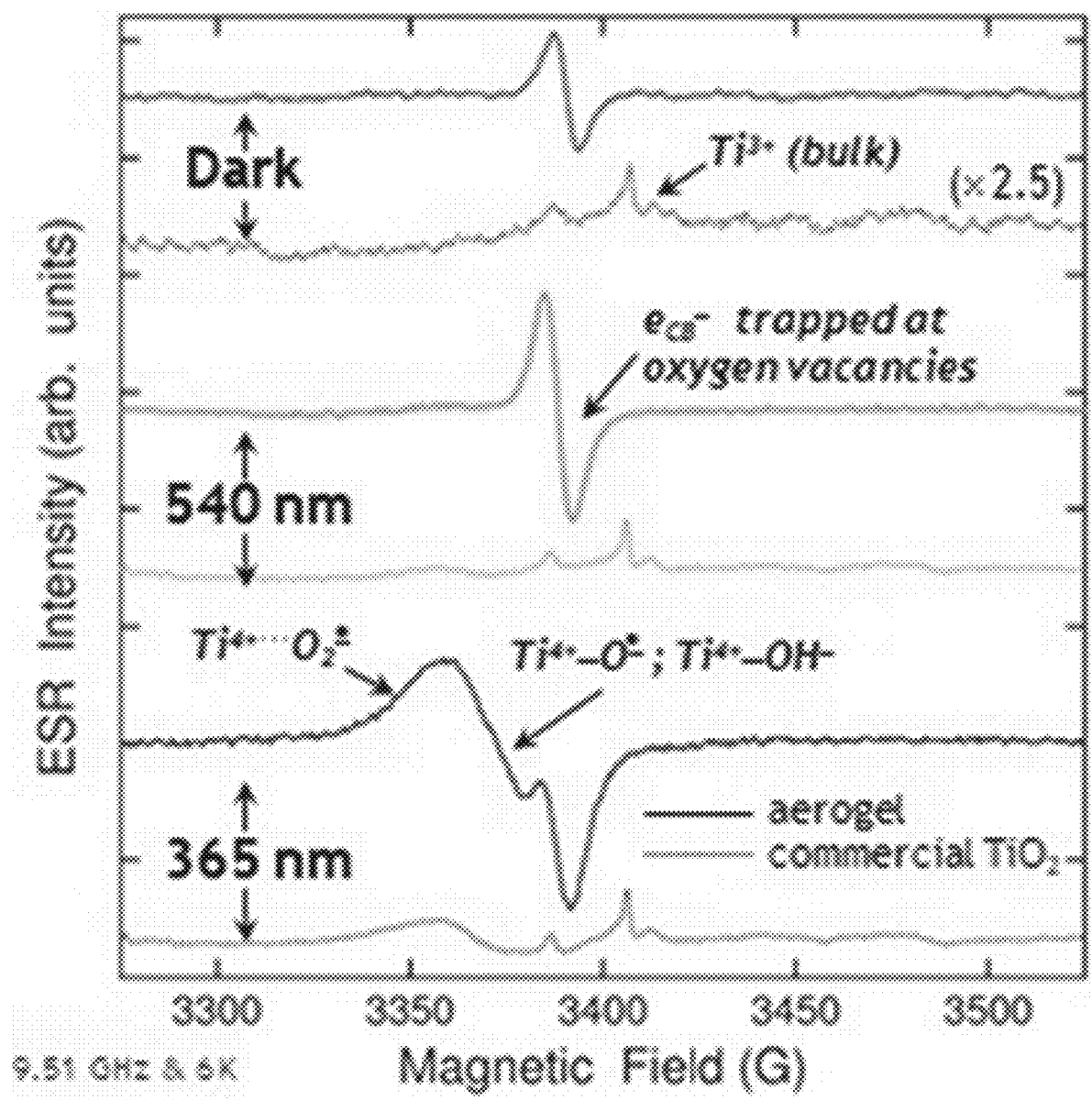
FIG. 4 shows the ability of covalently networked nanoscale reducing oxide ($TiO_2$ aerogel) to increase ROS species under UV-vis irradiation relative to nanoscale, commercially available $TiO_2$.

Mesoporous, nanostructured, $CeO_2$ may be prepared using a sol-gel synthetic protocol that allows tuning the structural and chemical properties that dictate ROS formation and storage in $CeO_2$ (Laberty-Robert et al., *Chem. Mater.* 18 (2006) 50-58; Laberty-Robert et al., *Adv. Mater.* 19 (2007) 1734-1739; Pitman et al., *Nanoscale Adv.* 2 (2020) 21491-21501). In particular, oxygen vacancy ($O_{vac}$) sites-which are stabilized by $Ce^{3+}$ and under-coordination of $Ce^{4+}$ at surface-terminating lattice sites—are responsible for activating $O_2$ and adsorbing superoxide and peroxide species (Du et al., *J. Phys. Chem. C.* 123 (2019) 1742-1750; Schilling et al., *Phys. Chem. Lett.* 9 (2018) 6593-6598). Cation dopants (e.g., $Gd^{3+}$) are incorporated and nanoscale dimensions of sol-gel-derived $CeO_2$ are controlled to rationally vary $O_{vac}$ content. The nanoscale dimensions and networked nature of $CeO_2$ particles inherent to sol-gel-derived $CeO_2$, as is the case for other reducing oxide aerogels (FIG. 4), aids in the stabilization of $O_{vac}$ and under-coordinated lattice metal ions. The formation energy for $O_{vac}$ is significantly lower on edge sites and adlineation sites (the interface between a supported metal and its high surface-area support) compared to extended, defect-free surfaces and enhanced by the flexibility of NPs to relax around oxygen vacancies (Migani et al., *Chem. Commun.* 46 (2010) 5936). The ability to synthetically tune the nanoscale dimensions of sol-gel-derived $CeO_2$ thus dictates the concentration of $O_{vac}$.

The composite, $CeO_2$-based aerogels described herein may provide several advantages with respect to the mitigation of organophosphorus CWAs under practical operating conditions, particularly compared to traditional oxide materials and state of the art "memory photocatalysts," as highlighted below.

- Effective decomposition of CWA simulant, DMMP, under both dark and photo-illuminated environments
- The $CeO_2$-based aerogels convert to an advantage what typically hinders memory catalysts the rapid scavenging of electrons by $O_2$—by stabilizing and storing ROS that form upon electron quenching with $O_2$
- Stabilization and storage of ROS, including superoxide and peroxide, for long time-periods, even under ambient conditions
- Photo-active light sensitizers that harvest a broad range of the solar spectrum
- A high surface-area, mesoporous expression of the composite that provides ample surface for chemical threat adsorption/degradation and pore networks that facilitate mass transport to the active surface
- Adaptability of epoxide-driven sol-gel chemistry to incorporate defects into the networked nanoscale solid, control morphology and pore structure, and modify the porous architecture with metal nanoparticles The composition includes a porous cerium oxide that is gadolinium-, samarium-, or lanthanum-substituted. This substitution may also be known as doping. The molar fraction of the gadolinium, samarium, or lanthanum atoms to the cerium atoms may be, for example, greater than zero and up to 0.05, 0.10, or 0.15 or any range made from these values. Suitable forms for the porous cerium oxide include, but are not limited to, aerogel, xerogel, and ambigel.

Optionally, the composition may include copper or gold nanoparticles. There may be, for example, more than zero and up to 1, 5, or 10 wt. % of the nanoparticles, or any range made from these values. In one embodiment, the composition includes gadolinium-substituted ceria and copper nanoparticles. Combinations of the various metals may be used.

Optionally, the composition may include a titania aerogel. The composition may include, for example, up to 10, 50, or 80 wt. % of the titania, or any range made from these values. The titania aerogel may be added by, for example, adding micron or sub-micron particles of pre-formed titania aerogel before formation of the gel. These particles may be rare earth-substituted and may contain plasmonic nanoparticles such as copper or gold.

Methods of making ceria and titania aerogels, xerogels, and ambigels are known in the art. The may be made by mixing a cerium salt, a gadolinium, samarium, or lanthanum salt, and an epoxide. A gel is formed, which is then dried to form an aerogel, a xerogel, or an ambigel. The method of adding the nanoparticles may depend on the type of nanoparticle. For example, gold nanoparticles may be added to mixture before either forming the gel or drying, while copper nanoparticles may be formed after drying by a photodeposition method (US Pat. Pub. No. 2017/0282162).

The composition may be used by exposing it to electromagnetic radiation to form ROS in the composition. Techniques described below can be used to determine whether the ROS are formed. Later, potentially in darkness, the composition is exposed to a liquid, vapor, or gaseous sample that may contain an organophosphonate compound. The ROS can decompose the organophosphonate compound.

The following examples are given to illustrate specific applications. These specific examples are not intended to limit the scope of the disclosure in this application.

Figure 5:
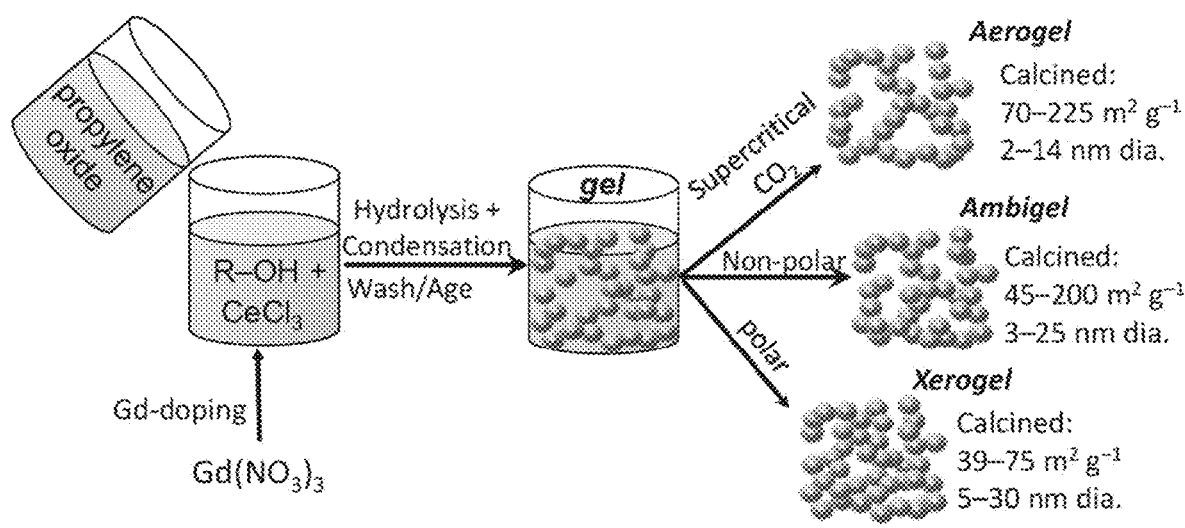
FIG. 5 shows a schematic of sol-gel synthesis of $CeO_2$ and GCO following: 1) epoxide-driven formation of colloidal sol and formation of wet gel with optional addition of stoichiometric Gd precursor; 2) drying of wet gel by solvent exchange with supercritical $CO_2$, nonpolar solvent, or polar solvent to form aerogel, ambigel, or xerogel (respectively); and 3) calcination to modify surface area and particle size.

In one synthetic protocol, wet $CeO_2$ gels are first formed by an epoxide-driven reaction with Ce(III) salts (FIG. 5). The manner in which the wet gels are dried determines the mesoporous structure of the dry solid, which ranges from the open, connected pores of aerogels to the denser, closed structure of xerogels, while ambigels display an intermediate range of porosity and void space. Both the mesoporous expression of $CeO_2$ (aerogel, ambigel, or xerogel) and the post-drying calcination treatment allows us to vary surface area (35-225 $m^2\ g^{-1}$), pore volume (0.07 to 1.78 $cm^3\ g^{-1}$), and average particle diameter of the networked oxide (5-20 nm) across a wide range (Laberty-Robert et al., *Chem. Mater.* 18 (2006) 50-58; Laberty-Robert et al., *Adv. Mater.* 19 (2007) 1734-1739).

Figure 6:
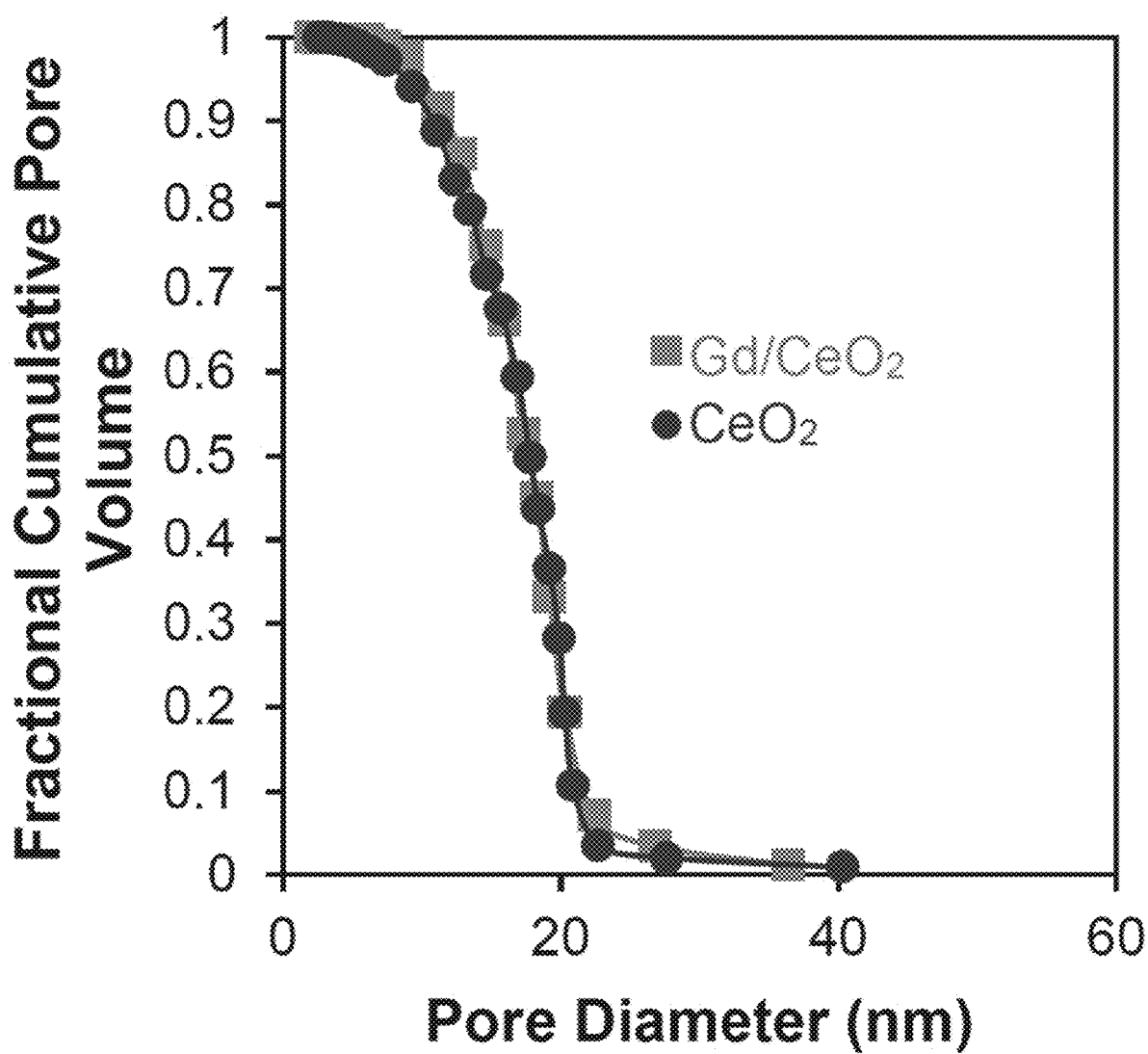
FIG. 6 shows fractional cumulative pore distribution derived from $N_2$ physisorption isotherms.

Substitution of di- and trivalent cations into the $CeO_2$ lattice is another means to force $Ce^{3+}$ lattice sites, which in turn, stabilize $O_{vac}$. Gadolinium (Gd) cations are incorporated into mesoporous $CeO_2$ (GCO) by adding nominal amounts of Gd-nitrate to the Ce(III) and epoxide sol-gel precursors (Laberty-Robert et al., *Adv. Mater.* 19 (2007) 1734-1739). The same drying and post-drying calcination protocols are then applied to produce GCO aerogels, xerogels, or ambigels. High weight loadings of Gd can be incorporated into sol-gel-derived $CeO_2$ with only minimal impact on average particle size, surface area, or pore volume relative to undoped $CeO_2$ for a given mesoporous expression (aerogel, ambigel, or xerogel) and calcination temperature. Both $CeO_2$ and Gd-doped $CeO_2$ aerogels have a majority of their pores distributed between 4-40 nm, with the majority of those pores distributed from 10-20 nm (FIG. 6). This pore-size range ensures near-open medium diffusion of small molecules to the high surface-area interior (Leventis et al., *Chem. Mater.* 11 (1999) 2837-2845). The fluorite crystal structure dominates regardless of Gd-doping (FIG. 7), revealing that Gd doping can be exploited to impart defects without impacting morphology or structure.

Figure 1:
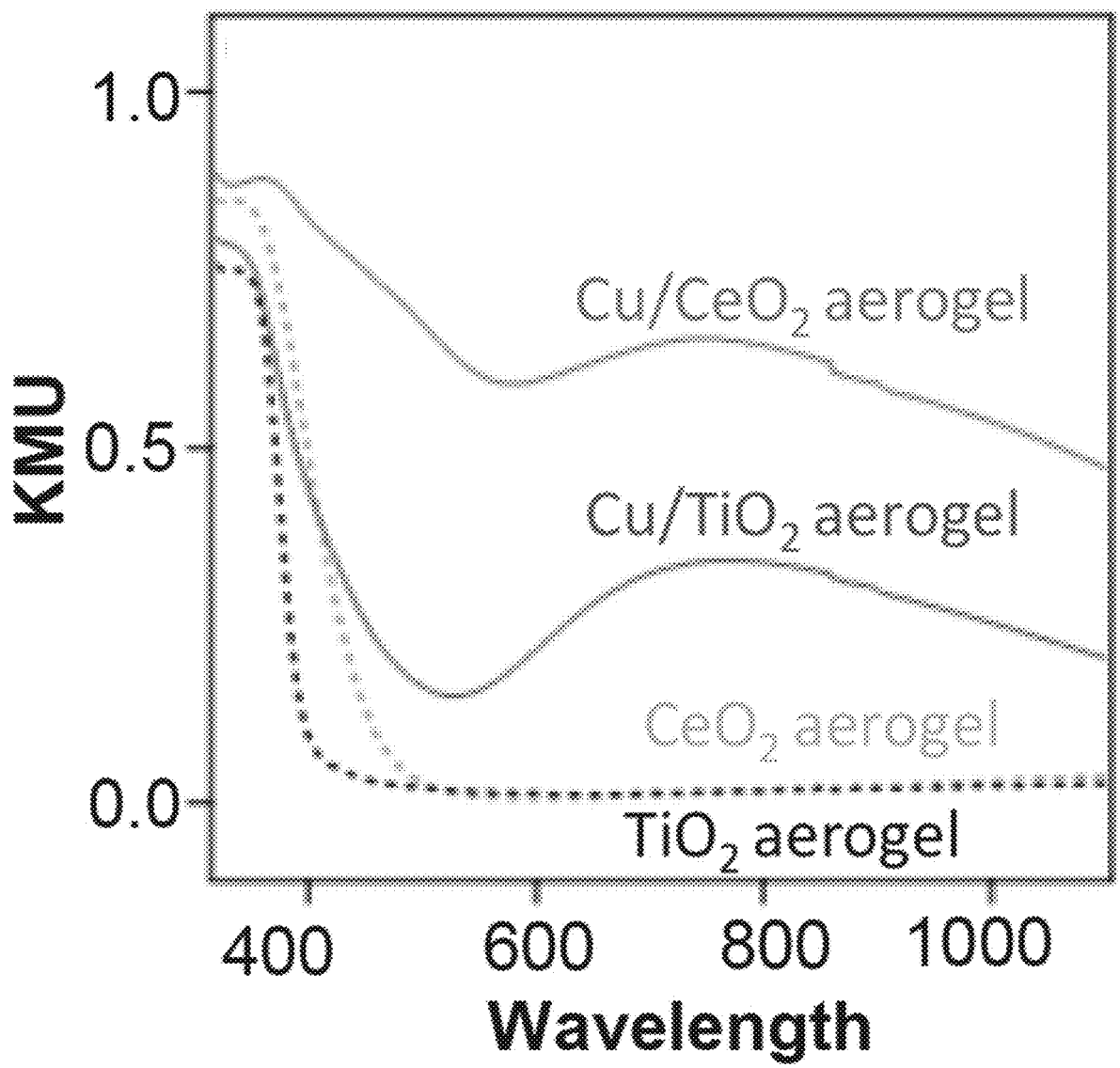
FIG. 1 shows UV-visible diffuse reflectance spectroscopy of $Cu/TiO_2$ and $Cu/CeO_2$ aerogels showing the Cu surface plasmonic resonance at ca. 750 nm.

To improve light harvesting, the $CeO_2$ may be coupled with nonprecious plasmonic Cu nanoparticles (NPs) (FIG. 1). The adsorption edge of $CeO_2$ aerogels is ~ 420 nm, and while this covers some of the visible spectrum, the majority of solar photons do not excite $CeO_2$. In contrast, the broad surface plasmon resonance (SPR) of Cu overlaps the most intense portion of the solar spectrum. Although plasmonic Cu is difficult to stabilize on oxide supports due to its propensity to oxidize, it has been demonstrated that significant interaction of Cu with a $CeO_2$ support stabilizes plasmonic Cu (FIG. 1). Mesoporous $CeO_2$ can accommodate up to 5 wt. % of plasmonic Cu NPs (Pitman et al., *Nanoscale Adv.* 2 (2020) 21491-21501). This protocol is also applied to couple $Gd:CeO_2$ with plasmonic Cu NPs. $CeO_2$ nano-domains can be inserted into the sol-gel-derived $Cu/TiO_2$ platforms in order to link the established ability of the metal‖$TiO_2$ interface to generate ROS (FIG. 4) to the storage ability of $CeO_2$.

Figure 8:
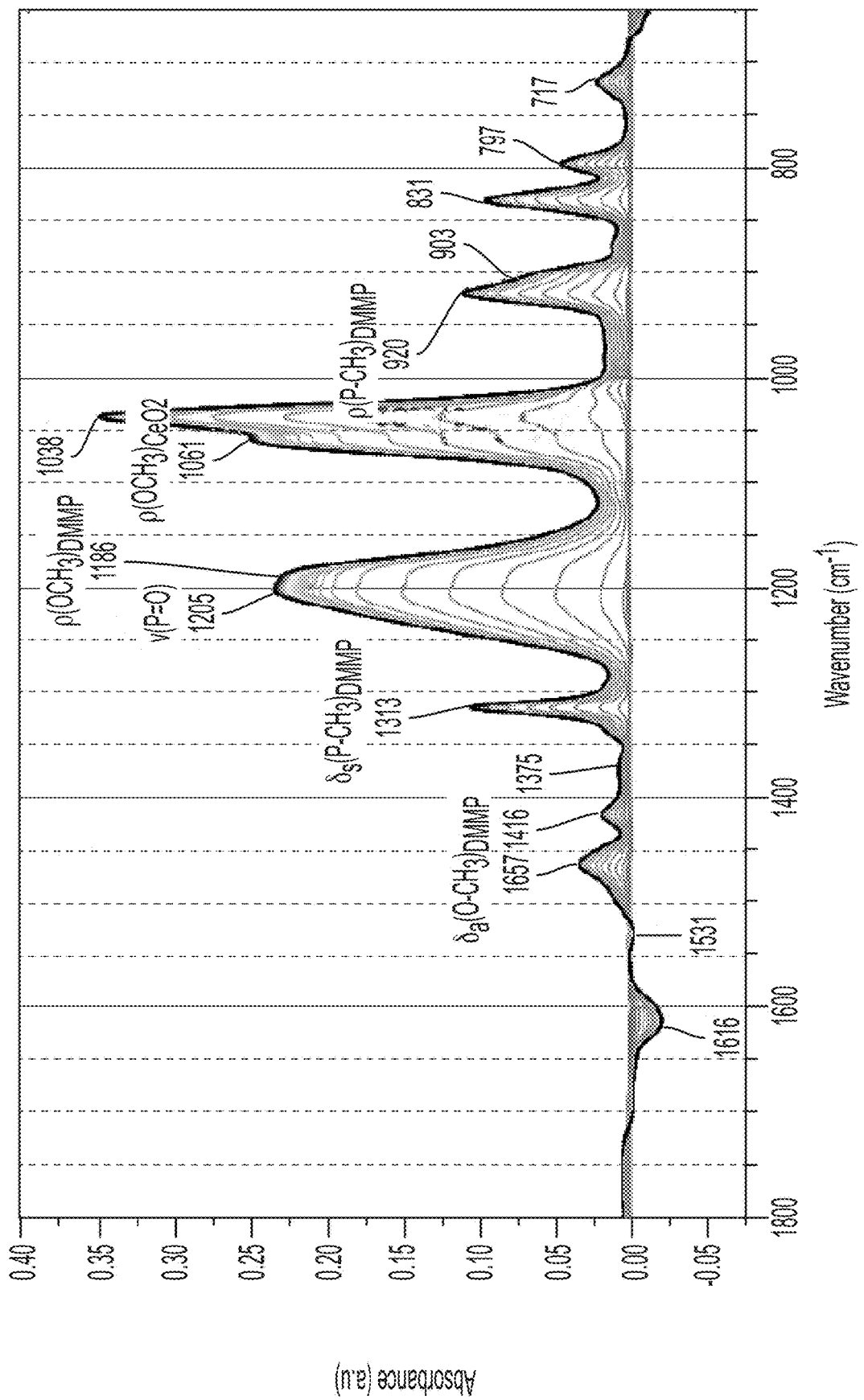
FIGS. 8-9 show attenuated total reflectance infrared (ATR-IR) spectroscopy for $CeO_2$ aerogels exposed to DMMP vapor for 1 h (FIG. 8) and $CeO_2$ aerogels sealed overnight after exposure to DMMP vapor with difference spectra plotted relative to $CeO_2$-coated prism (FIG. 9).
Figure 9:
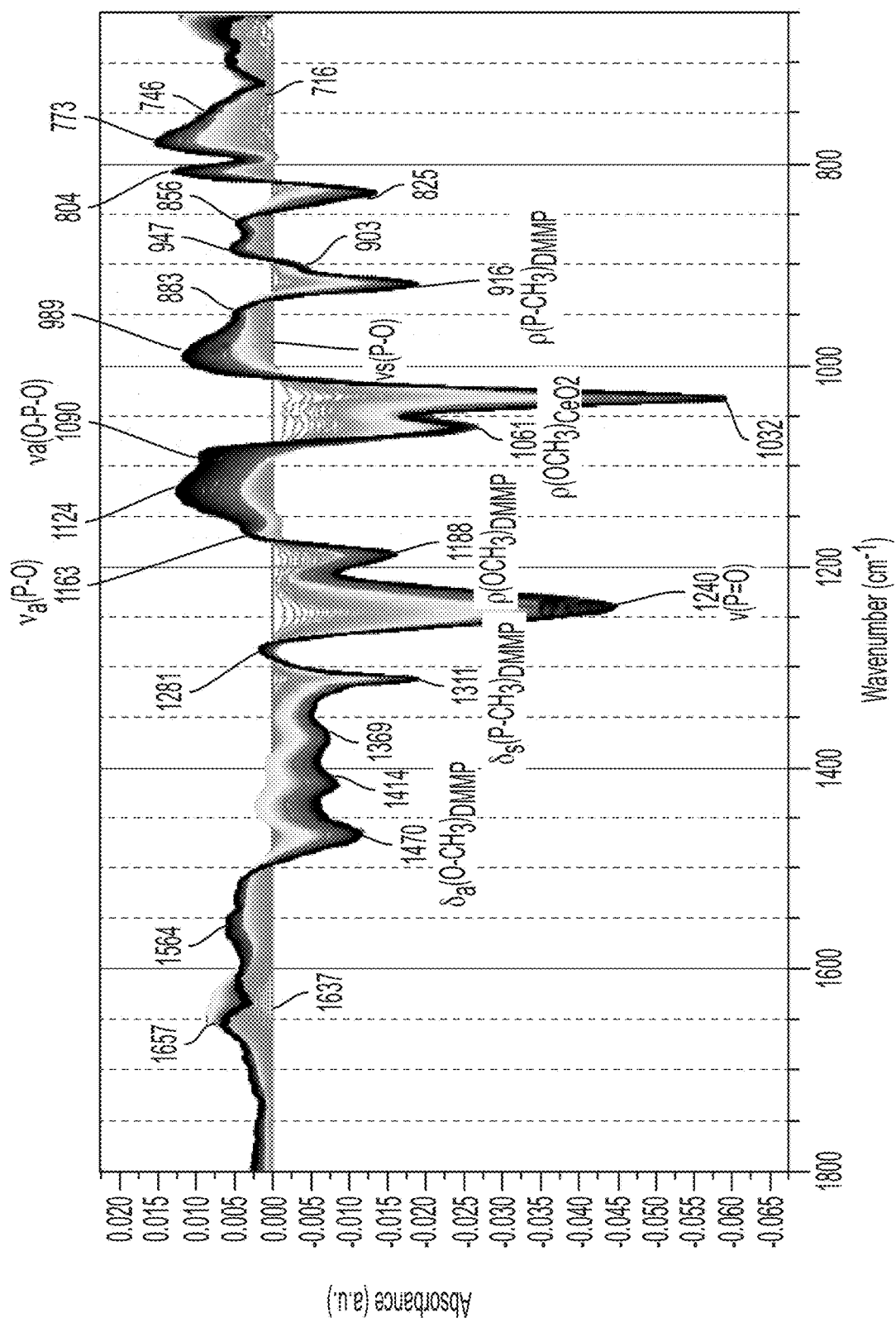

Attenuated total reflectance infrared (ATR-IR) spectroscopy and diffuse reflectance infrared spectroscopy (DRIFTS) were used to assess the activity of $CeO_2$-based materials for decomposition of a CWA simulant, dimethylmethylphosphonate (DMMP). Degradation trials were performed under both dark and photoilluminated conditions for native $CeO_2$ aerogels and composites modified with plasmonic Cu nanoparticle light harvesters. When $CeO_2$ aerogels are exposed to DMMP vapor in an ATR-IR reactor, the $CeO_2$ aerogel surface initially binds DMMP (FIG. 8). Features consistent with adsorbed, intact DMMP appeared on the $CeO_2$ surface, including the $\nu(P=O)_{DMMP}$, $\delta_a(OCH_3)_{DMMP}$, $\delta_s(P—CH_3)_{DMMP}$, $\rho(OCH_3)_{DMMP}$, and $\delta_s(P—CH_3)_{DMMP}$ modes (see Table 1 for mode assignments). Additional features are consistent with formation of degradation products. The features at 1150, 1060, and 1025 $cm^{-1}$ could have contributions from degradation products such as methylene phosphonate (MP) or $PO_x$ species along with overlapping contributions from $OCH_3$ groups on the $CeO_2$ oxide surface ($Ce—OCH_3$). Although degradation products are present during this initial DMMP vapor dosing, features for adsorbed DMMP are more prominent.

TABLE 1

Assignments of infrared spectral features for adsorbed dimethyl methylphosphonate (DMMP) and degradation products including methylmethylphosphonate (MMP), methylphosphonate (MP), $PO_x$ species, and surface-bound methoxy groups

| Adsorbed DMMP Mode | Wavenumber $(cm^{-1})$* | Degradation Product Mode | Wavenumber $(cm^{-1})$* |
|---|---|---|---|
| $\nu(P=O)_{DMMP}$ | 1220 | $\nu_s(O—P—O)$ | 1080-1088 |
| $\nu(C—O)_{DMMP}$ | 1070 | $\nu_a(P—O)_{MP}$ | 1150, 1050 |
| $\delta_a(O—CH_3)_{DMMP}$ | 1467 | $\nu_s(P—O)_{MP}$ | 983 |
| $\rho(O—CH_3)_{DMMP}$ | 1188 | $\nu(P—O)_{POx}$ | 1025, 987 |
| $\delta_s(P—CH_3)_{DMMP}$ | 1311 | $\rho(O—CH_3)_{CeO2}$ | 1105-1108, 1058-1065, 1015-1028 |
| $\rho(P—CH_3)_{DMMP}$ | 922 | | |

*assignments based on Chen et al., *Surf. Sci.* 604 (2010) 574-587

Figure 7:
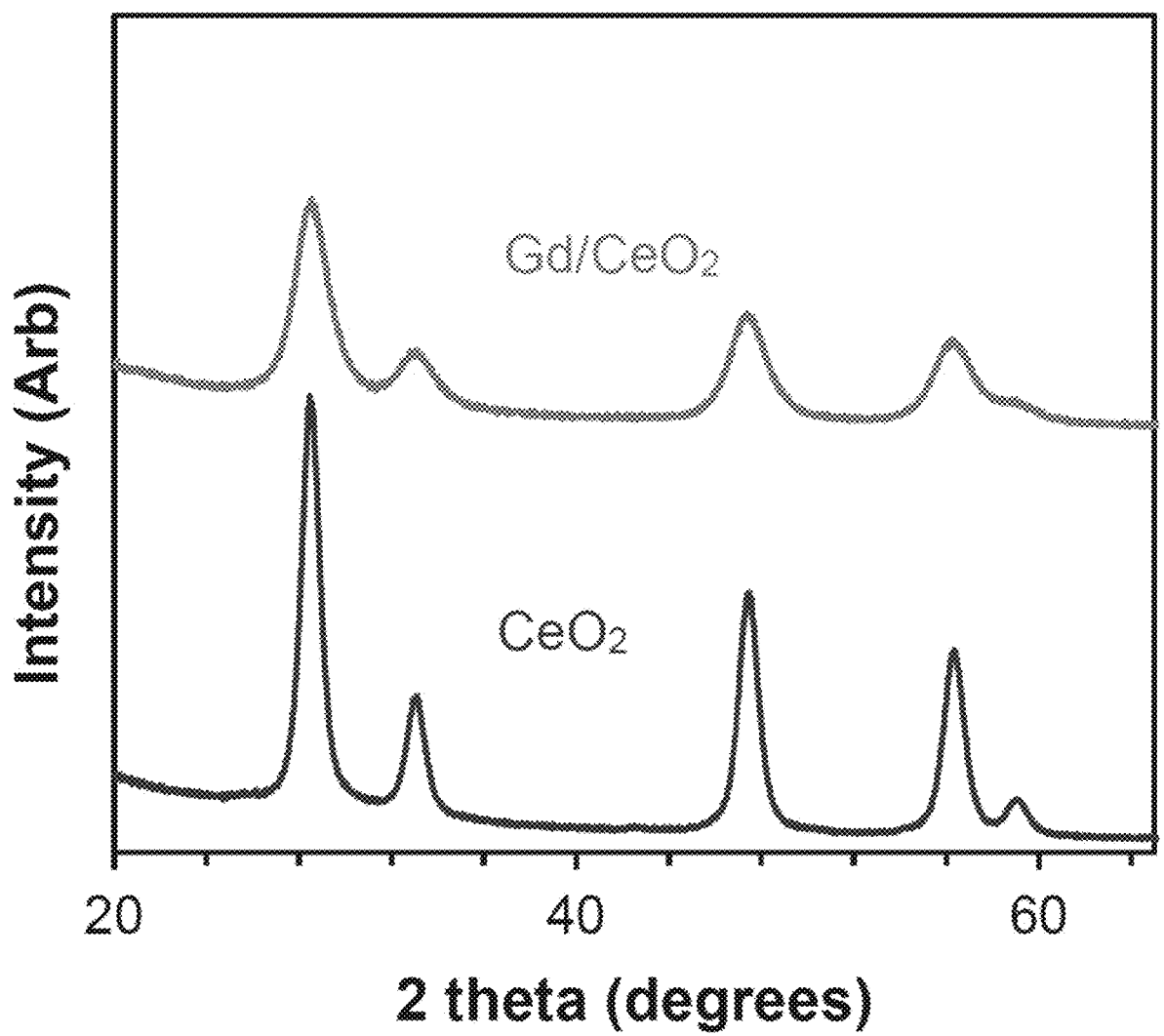
FIG. 7 shows X-ray diffraction plots for $CeO_2$ aerogel and Gd-doped $CeO_2$ aerogel.

When the ATR-IR reactor is sealed after dosing with DMMP vapor, negative peaks attributed to degradation of DMMP are observed concurrent with growth of positive peaks attributed to degradation (FIG. 7). DMMP consumption is evidenced by the loss of modes for $\nu(P=O)DMMP$, $\delta_a(OCH_3)_{DMMP}$, $\delta_s(P—CH_3)_{DMMP}$, $\rho(OCH_3)_{DMMP}$, and $\delta_s(P—CH_3)_{DMMP}$. A variety of spectral features consistent with either methyl methylphosphonate (MMP), MP, and/or $PO_x$ species are present. Intensity losses attributed to surface-bound methoxy modes ($\rho(O—CH_3)CeO_2$, ~1061, 1032 $cm^{-1}$) reveal that after methoxy modes are cleaved from the DMMP molecule, they may be further degraded.

Figure 10:
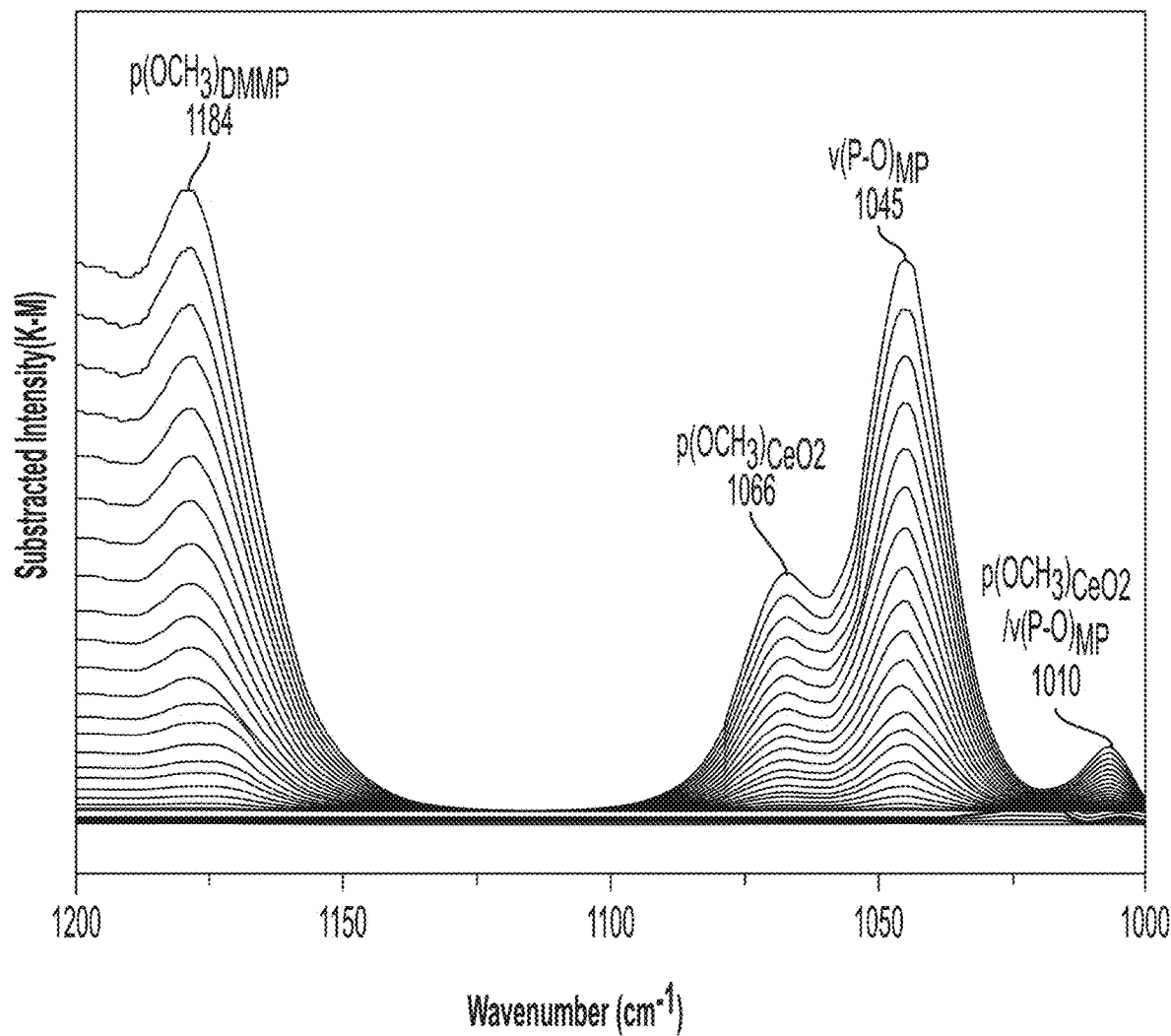
FIGS. 10-11 show difference diffuse reflectance infrared spectroscopy (DRIFTS) recorded at $CeO_2$ (FIG. 10) and $Cu/CeO_2$ (FIG. 11) aerogels during exposure to DMMP for 16 h in an $O_2$-rich reaction stream under broadband (UV+visible) illumination.
Figure 11:
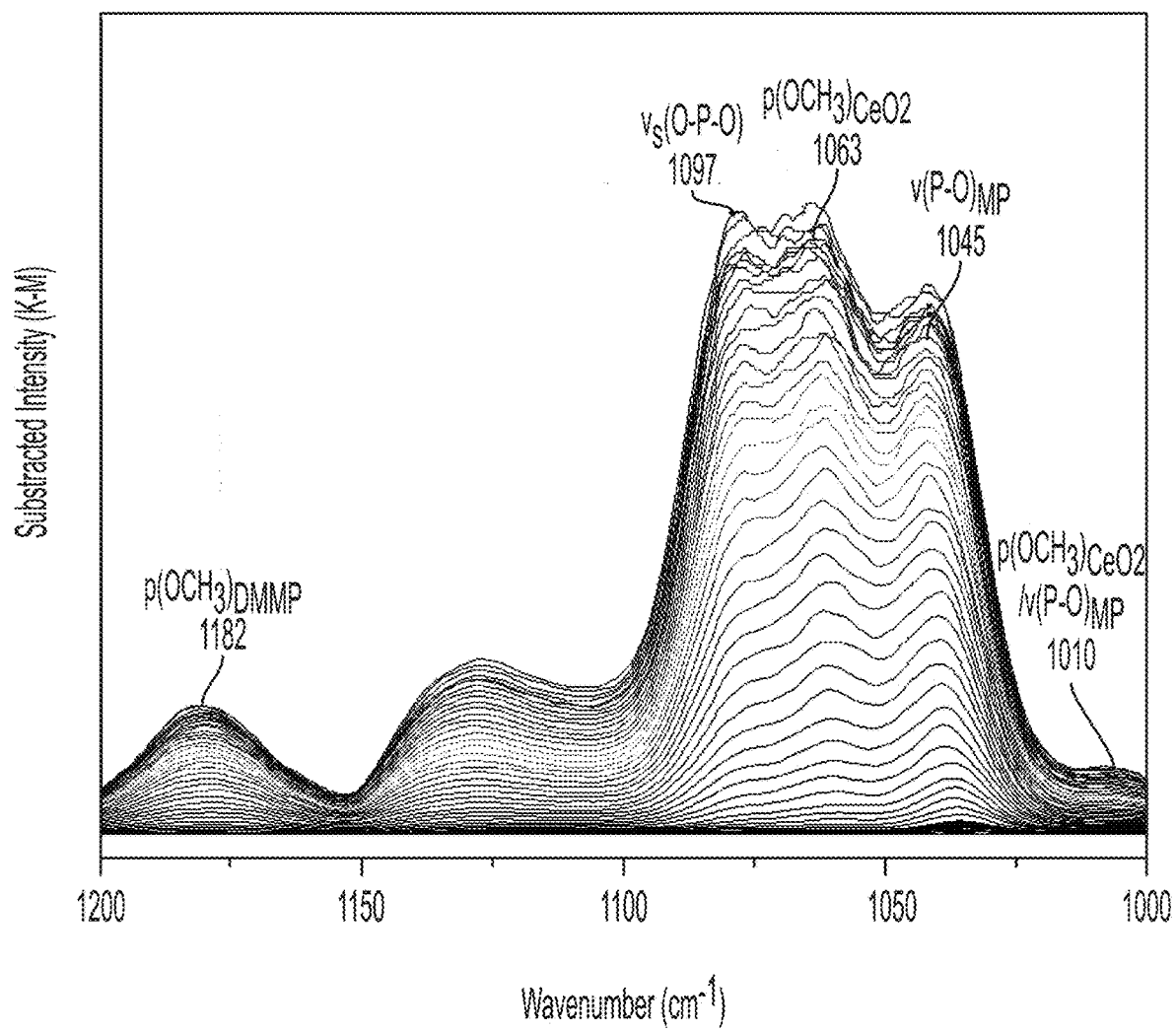

Adding plasmonic Cu nanoparticles to the $CeO_2$ aerogels can promote photo-initiated degradation pathways. DMMP exposures were compared for $CeO_2$ and $Cu/CeO_2$ aerogels under broadband illumination (UV+Visible light) in a DRIFTS reactor cell in an $O_2$-rich reaction stream (FIGS. 10-11). Spectra were recorded while dosing with DMMP vapor for 16 h. Both $CeO_2$ and $Cu/CeO_2$ aerogels accumulate adsorbed DMMP and degradation products under illumination, however, the $Cu/CeO_2$ shows more prominent degradation products and less prominent features for adsorbed DMMP compared to the $CeO_2$ aerogel. On the $CeO_2$ aerogel, the feature attributed to the $\rho(OCH_3)_{DMMP}$ mode is more intense than other spectral features attributed to degradation products, including $\rho(OCH_3)_{CeO_2}$ and $\nu(P—O)_{MP}$ (FIG. 10). The $CeO_2$ aerogel surface also does not display any O—P—O degradation products. In contrast, the Cu/CeO$_2$ aerogel shows a $\rho(OCH_3)_{DMMP}$ mode that is much weaker than those associated with degradation products (MP, PO$_x$, Ce—OCH$_3$), and additionally, the O—P—O feature is prominent. These results demonstrate how the addition of plasmonic Cu nanoparticles can enhance degradative activity under illumination.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
   a substituted porous cerium oxide;
      wherein the cerium oxide is substituted with gadolinium, samarium, or lanthanum;
   copper nanoparticles or gold nanoparticles; and
   a titania aerogel;
      wherein the composition comprises up to 80 wt. % of the titania aerogel.

2. The composition of claim 1, wherein the composition has a molar fraction of the gadolinium, samarium, or lanthanum atoms to the cerium atoms of up to 0.15.

3. The composition of claim 1;
   wherein the cerium oxide is substituted with gadolinium; and
   wherein the composition comprises the copper nanoparticles.

4. The composition of claim 1, wherein the cerium oxide is in the form of an aerogel.

5. The composition of claim 1, wherein the cerium oxide is in the form of a xerogel.

6. The composition of claim 1, wherein the cerium oxide is in the form of an ambigel.

7. A method comprising:
   exposing the composition of claim 1 to electromagnetic radiation to form reactive oxygen species in the composition.

8. The method of claim 7, further comprising:
   exposing the composition to a liquid, vapor, or gaseous sample; and
   allowing the reactive oxygen species to decompose any organophosphonate compounds in the sample.

* * * * *